United States Patent
Leahy

(10) Patent No.: US 11,625,340 B2
(45) Date of Patent: Apr. 11, 2023

(54) PROGRAMMATIC CONTROL OF DEVICE I/O; EMF QUIET MODE, ZONE, SIGNALING, AND PROTOCOL

(71) Applicant: Francis J. Leahy, Mill Valley, CA (US)

(72) Inventor: Francis J. Leahy, Mill Valley, CA (US)

(*) Notice: Subject to any disclaimer, the term of this patent is extended or adjusted under 35 U.S.C. 154(b) by 0 days.

(21) Appl. No.: 17/397,643

(22) Filed: Aug. 9, 2021

(65) Prior Publication Data

US 2022/0066952 A1    Mar. 3, 2022

Related U.S. Application Data

(63) Continuation of application No. 17/008,192, filed on Aug. 31, 2020, now Pat. No. 11,106,603.

(51) Int. Cl.
G06F 13/12    (2006.01)
G06F 13/42    (2006.01)

(52) U.S. Cl.
CPC ........ G06F 13/122 (2013.01); G06F 13/4282 (2013.01); *G06F 2213/0042* (2013.01)

(58) Field of Classification Search
CPC ...................................................... G06F 21/31
See application file for complete search history.

(56) References Cited

U.S. PATENT DOCUMENTS

| | | |
|---|---|---|
| 2004/0132483 A1 | 7/2004 | Kawamoto |
| 2005/0232580 A1 | 10/2005 | Goldberg et al. |
| 2008/0095097 A1 | 4/2008 | Mehta et al. |
| 2012/0093141 A1 | 4/2012 | Imes et al. |
| 2012/0113918 A1 | 5/2012 | Freda et al. |
| 2012/0225673 A1 | 9/2012 | Juhasz |
| 2019/0373532 A1 | 12/2019 | Juhasz et al. |
| 2021/0350309 A1* | 11/2021 | Zagbiv .................... G06T 11/60 |

OTHER PUBLICATIONS

International Search Report and Written Opinion dated Nov. 30, 2021 in PCT International Patent Application No. PCT/US2021/048503, 36 pages.

* cited by examiner

*Primary Examiner* — Henry Tsai
*Assistant Examiner* — Juanito C Borromeo
(74) *Attorney, Agent, or Firm* — Perkins Coie LLP

(57) ABSTRACT

Programmatic control of device I/O and EMF quiet mode, zone, signaling, and protocol are disclosed. Programmatic device I/O control reduces EMF radiation from a device with a device I/O controller application for programmatic control of the device's I/O channels. Responsive to firing of control rules, the device I/O application calls device APIs to control I/O channel settings. A quiet mode that reduces overall EMF radiation from a device is administered by an administrator and controls the device's wired or wireless I/O channels to create an EMF quiet zone in which some or all devices in a vicinity respond to a request to put themselves into an EMF quiet mode.

27 Claims, 7 Drawing Sheets

PROGRAMMATIC CONTROL OF DEVICE I/O; EMF QUIET MODE, ZONE, SIGNALING, AND PROTOCOL

CROSS-REFERENCE TO RELATED APPLICATIONS

This application is a continuation application of U.S. application Ser. No. 17/008,192, titled "Programmatic Control of Device I/O; EMF Quiet Mode, Zone, Signaling, and Protocol," and filed on Aug. 31, 2020, which is incorporated by reference herein in its entirety.

TECHNICAL FIELD

Various of the disclosed embodiments concern programmatic control of device I/O and EMF quiet mode, zone, signaling, and protocol.

BACKGROUND

Some individuals are EMF (electromagnetic field or electromagnetic frequency) sensitive, and many others prefer to reduce their EMF exposure, as well as that to their family or others around them. For example, whenever anyone enters such individual's house, or when the individual is in a car with others, they may ask these others to set their phones to airplane mode so that the device is no longer sending and receiving wireless signals, e.g. cellular, Bluetooth, Wi-Fi, etc. Such individuals may also make their home as EMF quiet as possible in this day of ubiquitously connected devices, e.g. they may decide not to have Wi-Fi enabled in their house, and they may connect some or all of their devices, including their mobile devices, to the Internet via hard-wired ethernet or similar cables.

EMF radiation is a bigger problem than for just people who are EMF sensitive. EMF is a problem for pregnant mothers because it has been shown that high exposure can increase miscarriages three-fold and result in brain abnormalities. EMF is a problem for young men whose sperm has been shown to be both severely damaged, and significantly reduced, by wireless radiation exposure. EMF is a problem for babies and children because their skulls are thinner, which means that their exposure is up to two times higher in the brain, and ten times higher in the bone marrow of the skull, versus that encountered with mobile phone use by adults. EMF is also a problem for animals and insects, particularly bees whose behavior and physiology are influenced by radiation from cell towers. Further, cell tower radiation can disrupt the magnetic compass that bees and migrating birds use for navigation.

There are other reasons why people might want to control their phone's airplane mode, and wireless signals. For example, in this age of constant interruptions, it can be useful to be able to create time and space where interruptions are impossible, or at least reduced, such as while thinking, writing, playing music, on a hike, or sharing a meal with family or friends.

A personal mobile device, such as an iPhone, is just one of many EMF generating devices with which we interact on a daily basis, whether we know it or not. We are surrounded by Wi-Fi routers and repeaters, computers, laptops, hubs, routers, Xboxes, PlayStations, cell phone repeaters, smart homes, smart meters, Wi-Fi enabled thermostats, Bluetooth and Wi-Fi enabled baby monitors, home security cameras, etc. There is also the phone in the pocket of the person sitting next to you at Starbucks, the Wi-Fi router hidden in the closet of the Airbnb you're renting, and the smart car software that's running in your rental car. All of these things, and more, are generating EMF and adding to an ever more crowded EMF landscape.

SUMMARY

Programmatic control of device I/O and EMF quiet mode, zone, signaling, and protocol is disclosed.

Programmatic device I/O control reduces EMF radiation from a device with a device I/O controller application for programmatic control of the device's I/O channels. Responsive to firing of control rules, the device I/O application calls device APIs to control I/O channel settings.

A quiet mode that reduces overall EMF radiation from a device is administered by an administrator and controls the device's wired or wireless I/O channels to create an EMF quiet zone in which some or all devices in a vicinity respond to a request to put themselves into an EMF quiet mode.

DETAILED DESCRIPTION

Programmatic Control of Device I/O

Embodiments of the invention concern control of a phone's wireless device I/O channels, e.g. via airplane mode, so that instead of the phone being "on" all the time, it would check for incoming messages on a schedule, e.g. every 10 minutes, or every hour, so that it is "off" most of the time. This reduced schedule of operation correspondingly reduces the EMF radiation from the phone by 95% and more. For purposes of the discussion herein, airplane mode refers to the ability to control some or all wired and wireless device I/O channels.

However, neither Apple (iOS) nor Android provide a developer-accessible API to any of the phone device I/O: not for Wi-Fi, Bluetooth, or cellular I/O. The fact that the API is currently inaccessible does not mean that providing an application for controlling it is not a good idea, or incapable of reduction to practice.

Device I/O Controller Application

Embodiments of the invention provide an application, i.e. the device I/O controller, that controls any or all of a device's I/O channels. I/O channels include both low-level device I/O, such as the cellular network, Wi-Fi, Bluetooth, etc., as well as higher-level device I/O, such as phone, text, email, Internet, games, music, video, etc. Channels can be wired or wireless.

Figure 1:
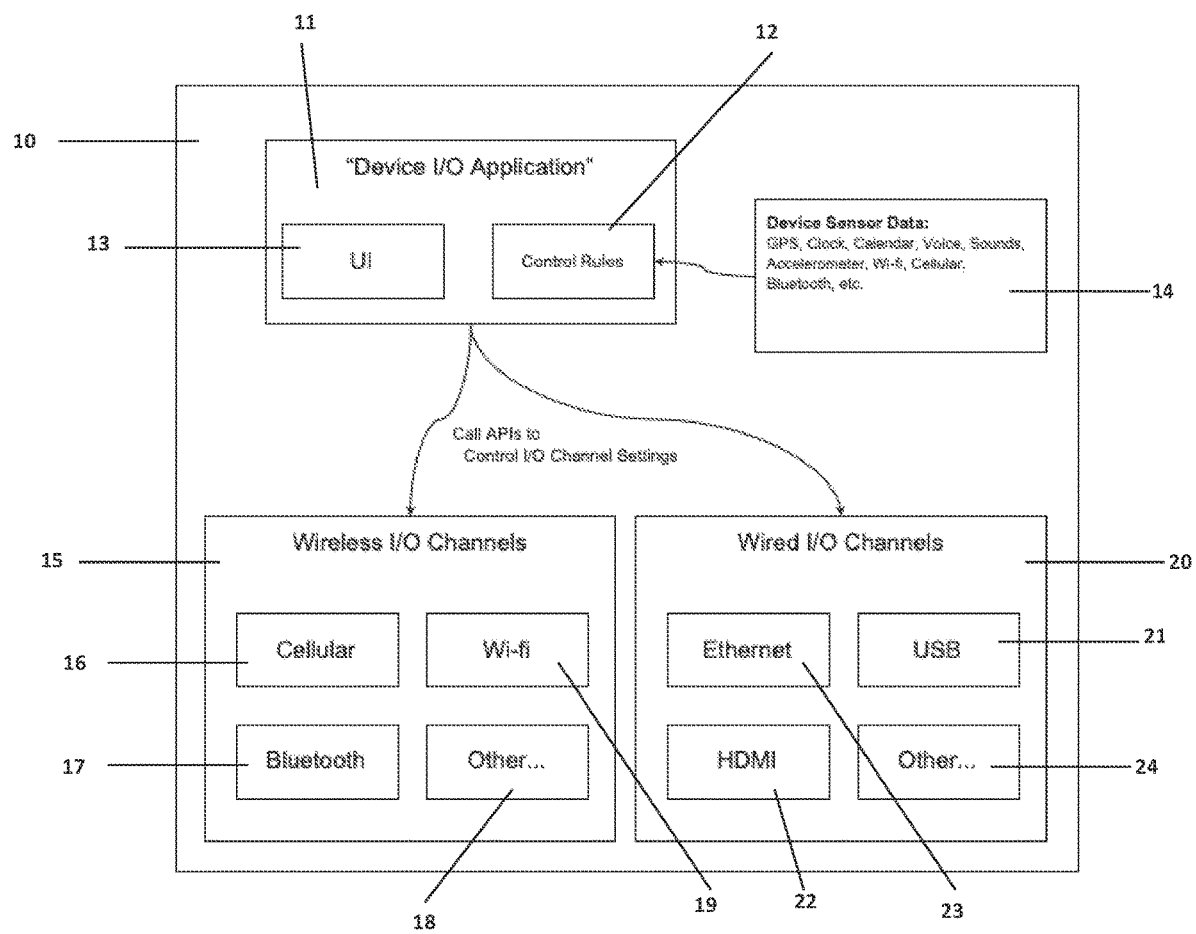
FIG. 1 is a block diagram showing a user device and device I/O controller application.

FIG. 1 is a block diagram showing a user device and device I/O controller application. In FIG. 1, a device 10 includes a device I/O application 11, which includes a user interface 13 and a set of control rules 12. The control rules are fired, for example, based on device sensor data 14. The device I/O application calls device APIs to control I/O channel settings, e.g. for wireless I/O channels 15 for cellular 16, Bluetooth 17, WI-Fi 19, and other 18 facilities, and to control wired I/O channels 20 for ethernet 23, USB 21, HDMI 22, and other 24 facilities.

Controls are rules-based, and can include, but are not limited to, the following types of rules:

Time-based rules: For example, the device defaults to an established schedule, e.g. check once an hour, but check every ten minutes during work hours; do not check between 10 pm and 7 am, while the user is asleep, or during family dinner time; do not check on Sunday; etc.

Location-based rules: For example, check every ten minutes at work, but only check every hour at home; do or do not check when the user is walking at a location associated with recreation or exercise; do or do not check when the user is visiting friends whose locations have been added to the app; etc.

Activity-based rules: For example, turn off everything except the ability to make and receive phone calls while exercising (GPS and/or motion could be used to determine this); turn off everything except the Wi-Fi while the user is flying (GPS height and speed information could be used to determine this); turn off everything while the user is meditating or while using a meditation app; turn off everything when the user turns the phone upside down on a table; etc.

Voice-based: For example, the user could say "Turn off for the next hour;" "Check now;" "Turn off until tomorrow morning at 8 am"; etc.

Country defaults: Some countries, such as France, have laws that do not allow emails to be received between certain hours and on certain days. The application could be programmed to use country-based rules as a baseline.

Other rules: Embodiments of the invention use other internal and external inputs to define rules which control the device, for example the amount of ambient light, whether the device is in night shift mode, the device orientation, the accelerometer data, nearby sounds, proximity to others, etc.

Controlling Other Devices

Whether we know it or not, we are surrounded by a plethora of EMF emitting devices, such as Wi-Fi routers and extenders, computers, laptops, hubs, routers, Xboxes, PlayStations, cell phone repeaters, smart homes, smart meters, Wi-Fi enabled thermostats, Bluetooth and Wi-Fi enabled baby monitors, and home security cameras. A natural extension of the ability to control our personal mobile device is the ability to control other devices which we own or have the ability to control. In embodiments of the invention, the same device I/O controller application which is used to control the mobile phone on which it is installed can be enhanced to configure and control any of the other devices to which we have physical or virtual access.

Figure 2:
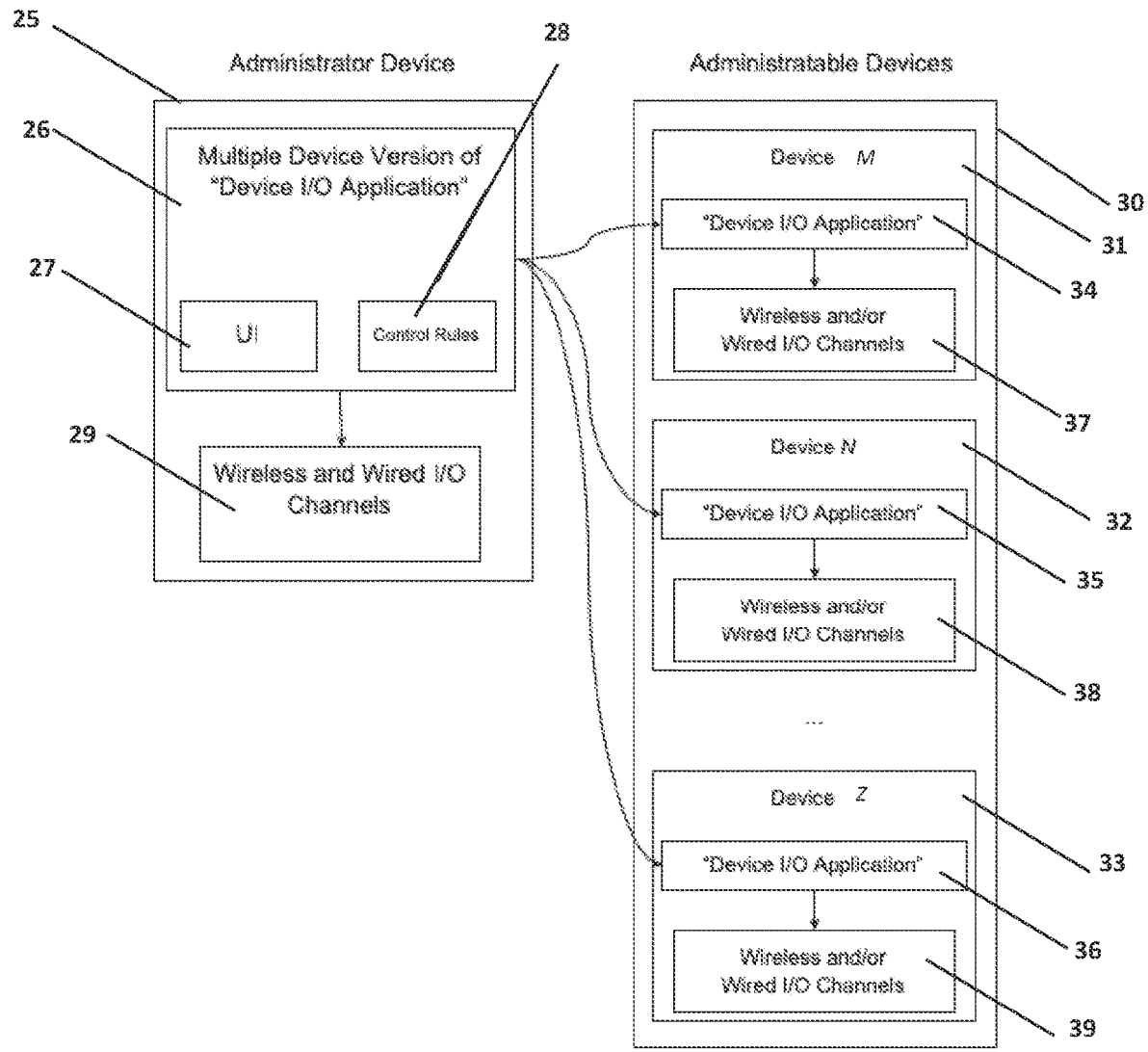
FIG. 2 is a block diagram showing device administration.

FIG. 2 is a block diagram showing device administration. In FIG. 2, an administrator device 25 includes a multiple-device version of the device I/O application 26, which includes a user interface 27 and a set of control rules 28 which it stores in its memory. The control rules are fired, for example, based on device sensor data (see FIG. 1) or other data.

The administrator device then addresses, and sends commands to, the various administrable devices 30, for example devices M-Z (31, 32, 33) each of which includes a respective device I/O application (34, 35, 36) and respective wireless and wired I/O channels (37, 38, 39).

Devices and users can be placed into categories such as "child" or "parent," "phone" or "laptop." Rules-based controls can be set up and applied to specific categories such as ["child" and "phone" ], or to combinations of categories such as ["child" or "phone" ]. Controls can use any of the same rules-based criteria as defined above. Rules are delivered to devices via standard Internet protocols, such as TCP/IP, and each device's acknowledgment and current settings can be displayed by the application.

Corporate Version

The device I/O controller application can be enhanced to allow devices belonging to a corporation, or other entity, to be controlled by an administrator. The administrator can classify and characterize devices based on characteristics such as "device type," e.g. iPhone, tablet, laptop, etc., or "device category," e.g. library device, lab device, personal device, etc., as well as to classify and categorize users. For example, a school might define user categories such as "administrators," "teachers," "students," "staff," and "guests," while a corporation might define user categories such as "executives," "legal," "IT," "site reliability," "engineering," "accounting," etc.

Figure 3:
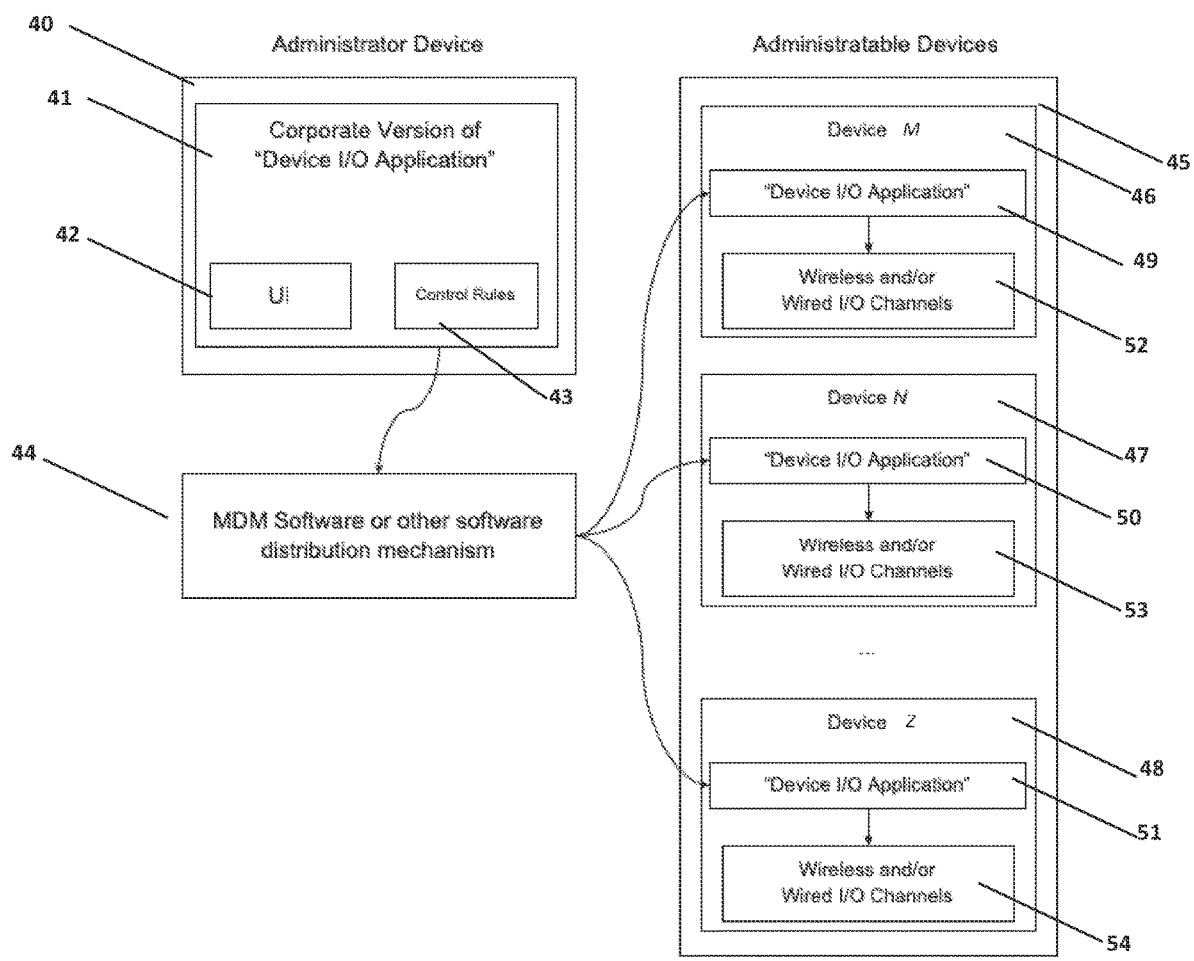
FIG. 3 is a block diagram showing corporate device administration.

FIG. 3 is a block diagram showing corporate device administration. In FIG. 3, an administrator device 40 includes a corporate version of the device I/O application 41, which includes a user interface 42 and a set of control rules 43. The control rules are fired, for example, based on device sensor data (see FIG. 1) or other data. The device I/O application communicates with a software distribution system 44, such as mobile data management (MDM) software. The software distribution system addresses various administrable devices 44, and it sends commands to, for example, devices M-Z (46, 47, 48), each of which includes a respective device I/O application (49, 50, 51) and respective wireless and wired I/O channels (52, 53, 54).

Devices and users can be part of one or more types or categories. Controls and rules can be assigned on a gross basis, to all devices, or on a fine-grained basis, to any combination of device and/or or user, type and/or category. When a device/user is part of more than one type or category, the administrator can decide whether the rules to be used on the device are the most or least restrictive of all of the applicable rules. Rules can also be delivered via corporate MDM software.

EMF Quiet Mode, Zone, Signaling, and Protocol

We are surrounded by Wi-Fi routers and repeaters, computers, laptops, hubs, routers, Xboxes, PlayStations, cell phone repeaters, smart homes, smart meters, Wi-Fi enabled thermostats, Bluetooth and Wi-Fi enabled baby monitors, home security cameras, etc. Embodiments of the invention, in addition to controlling personal mobile devices, can also control some or all of these other devices as well.

Such control concerns two things: knowing which devices in the vicinity are emitting EMF, and of those which are controllable; and changing the wired or wireless I/O settings of those devices, so that they are off, or connecting less frequently and, in doing so, reducing the amount of EMF they are radiating while one is in the vicinity of these devices. For example, if a user has a Wi-Fi router at home, such control would mean knowing whether it was on or off, and then having the ability to tell it to turn on or off. Control could mean being able to turn all of the children's phones to airplane mode while they are doing homework, turn all of the family's phones to airplane mode during family dinner time, and also after 10 pm at night. It could mean telling the smart meter to send out data only once an hour, rather than every 30 seconds as it does now. It could mean temporarily quieting the phones of those in a theater, or at a lecture.

An extension of controlling devices that one has access to is the ability to control devices in a particular setting or location. Schools want to know that student phones are not being used during class. Hospitals want to ensure that mobile devices are in airplane mode in certain parts of the hospital, so they do not interfere with important equipment. Airlines would like to be sure that passenger phones are in airplane mode during take-off and landing. A corporation might want to ensure that Bluetooth is turned on (or off) on all phones which are taken into specific buildings.

EMF Quiet Mode and EMF Quiet Zone

In 25 years, we will likely think of EMF radiation in much the same way that we think of smoking. Seventy years ago, smoking was ubiquitous. It was in the air around us, everyone did it, no one complained about the health issues, and if someone did complain they were thought to be a little bit crazy. Then things started to change, first with the 1964 Surgeon General's report, and finally, in 1995, California became the first state to ban smoking indoors. The same progression is likely to happen with EMF where, in the not too distant future, places such as restaurants, churches, hospitals, parks, and day care centers will start displaying an EMF quiet zone sticker showing that the people in that location prefer to have their devices emitting as little EMF radiation as possible. For the purposes of the discussion herein, two concepts are defined:

EMF quiet mode refers to the ability to control a single device's wired or wireless I/O channels for the purpose of reducing EMF levels.

An EMF quiet zone (or EMF quiet space) is a place where devices are expected to, are able to, and are willing to, subscribe to a set of rules defined by the administrator of the EMF quiet zone. The rules specify how "quiet" the zone is, and can range anywhere from fully quiet/all wireless I/O channels off, to preferred check interval is five minutes, to parents with children can check every two minutes while all others can check once an hour, to no restrictions from 1 pm-5 pm, or any other set of rules as defined by the administrator.

EMF Quiet Mode

The purpose of defining an EMF quiet mode is to reduce overall EMF exposure, reduce interruptions, save battery life, and be in control of our devices instead of them being in control of us. Any device which emits EMF via wireless protocols, such as phones, Wi-Fi routers, cellular repeaters, etc., could support EMF quiet mode, either actively, i.e. the device understands the concept of EMF quiet mode and is able and willing to be controlled, or passively, i.e. the device does not understand the concept of EMF quiet mode but can still be programmed to turn wired or wireless I/O channels on and off. When a device actively supports EMF quiet mode, the device allows its wired and wireless device I/O channels to be controlled either directly on the device, or via the EMF quiet mode protocol (see below).

When a device is in EMF quiet mode it helps to create an EMF quiet zone. An EMF quiet zone is a place where some, or preferably all, of the devices in the vicinity are able, and willing, to respond to a request to put themselves into EMF quiet mode. The cultural equivalent of an EMF quiet zone is a non-smoking area such as a non-smoking house, non-smoking hotel room, non-smoking car, non-smoking office, etc.

Figure 4:
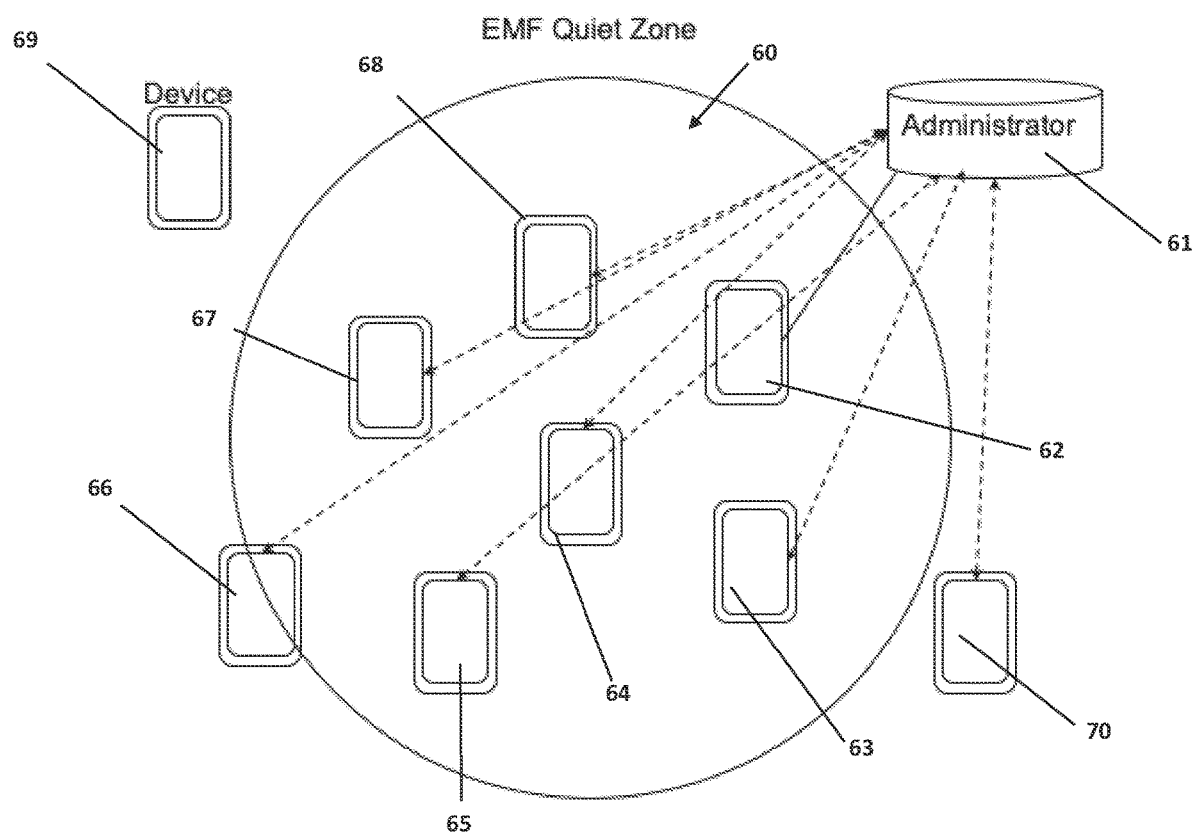
FIG. 4 is a block diagram showing an EMF quiet zone.

FIG. 4 is a block diagram showing an EMF quiet zone. In FIG. 4, an EMF quiet zone 60, administered by an administrator 61, is shown encompassing several devices 62-68, while devices outside of the EMF quiet zone 69, 70 are not administered.

The EMF quiet zone can turn some or all of a device's wired or wireless I/O channels on and off using a timer, or other characteristics such as location, time of day, orientation, proximity to others, or until commanded to do so, e.g. via a voice command or API request.

The EMF quiet zone sets the quiet interval of any device wired or wireless I/O channels such that it is off during the quiet interval, then turns on, performs a check for incoming messages, then turns off again. In embodiments of the invention, this interval is based on, but is not limited to, any of the following characteristics:

Fixed time e.g. check every ten minutes.

Dynamic time e.g. check every ten minutes during the workday, every hour outside of work hours.

Location based, e.g. check once when I arrive at work and then every ten minutes while at work, once when I arrive at home then every hour while at home, off at all other locations.

Movement based, e.g. turn off while jogging, check every five minutes while in a car, turn off while in an airplane.

Orientation based, e.g. check automatically when I remove the device from my pocket and look at it.

Voice control, e.g. saying "check now" will cause the device to check now.

Other control options, e.g. the amount of ambient light, whether in night shift mode, the device orientation, accelerometer data, nearby sounds, proximity to others, etc.

When the EMF quiet mode interval expires, some or all of the controlled device's wired or wireless I/O channels are turned on, a check is made for incoming messages on the specified channels, and the channel or channels are turned off again. After the check is made, the type (email, text, calls, voicemail, etc.) and number of messages is messaged to the user using audio, e.g. using different sounds per incoming message type, device shake, visual display on home screen, etc.

Figure 5:
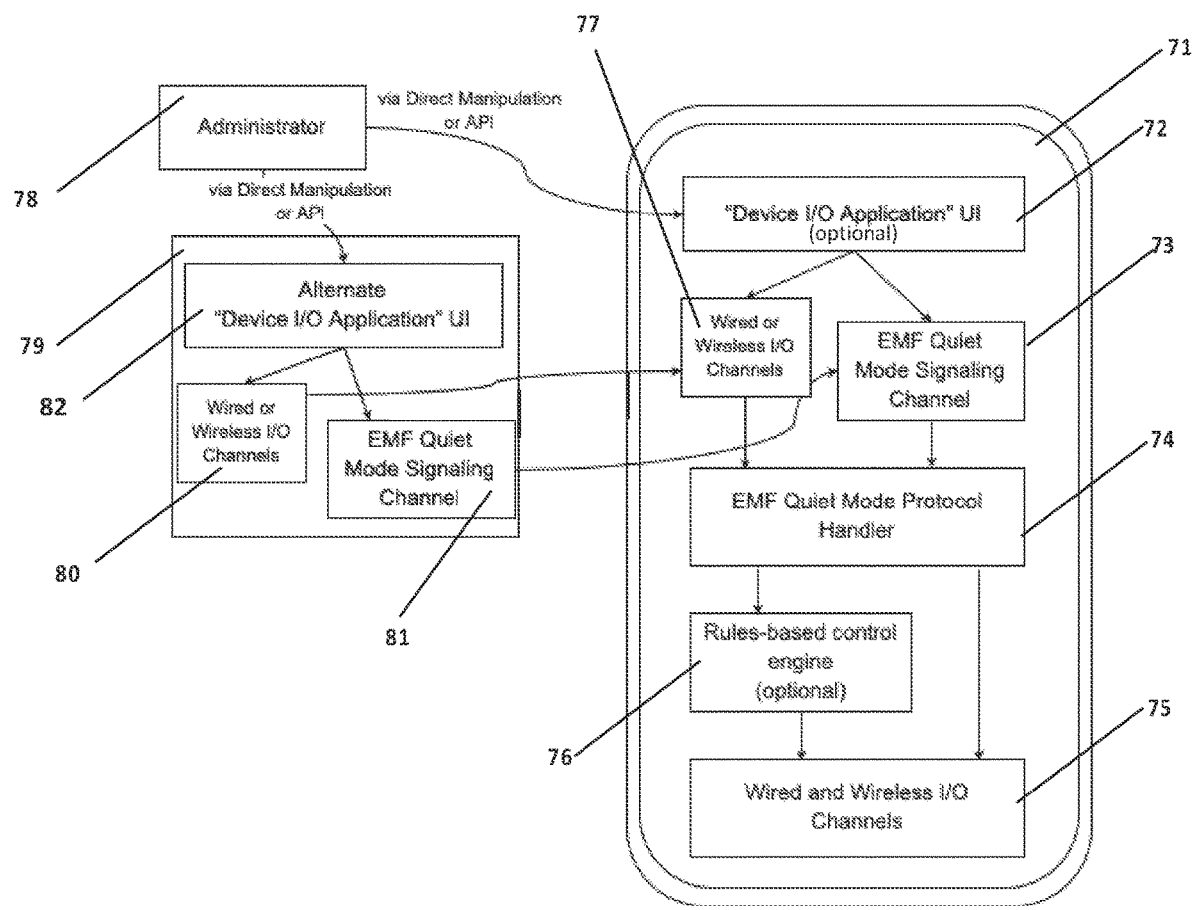
FIG. 5 is a block diagram showing administration of an EMF quiet zone capable device.

FIG. 5 is a block diagram showing administration of an EMF quiet zone capable device. In FIG. 5, an EMF quiet zone capable device 71 can be controlled by an administrator 78 either by direct manipulation or via an API. The EMF quiet zone capable device may include an optional device I/O application with an optional user interface 72 that responds to such control. The device I/O application may also be controlled by receipt of administrator instructions from an administrator computer 79 that includes an alternate device I/O application UI 82. The EMF quiet zone capable device 71 can also be controlled by an EMF quiet mode protocol that can be delivered either via wired or wireless I/O channels 80 to the device 77, or via an EMF quiet mode signaling channel 81 delivered to the device EMF quiet mode signaling channel 73. An EMF quiet mode protocol handler 74 receives signals from the wireless or wired I/O channels 77 or the EMF quiet mode signaling channel 73 and accesses an optional rules-based control engine 76 as appropriate. The control rules are fired, for example, based on device sensor data (see FIG. 1) or other data. Accordingly, wired and wireless I/O channels 75 within the device are controlled.

EMF Quiet Zone

An EMF quiet zone is a place where devices are expected to be as digitally silent as possible, based on the level of digital silence defined by the EMF quiet zone administrator. This can range from "completely off" to something like "intermittent checks are fine as long as they are no more frequent than every five minutes" all the way to something like "no controls are in place from 8 am-5 pm" or "no controls 24 hours a day." Devices which subscribe to a new EMF quiet mode protocol (see below), allow themselves to be controlled for the purposes of EMF and digital quieting. This allows devices to respect and respond to EMF quiet zones rules.

The EMF quiet mode protocol defines a set of commands and responses that let the EMF quiet zone administrator control devices that enter its sphere of influence, e.g. near or inside a restaurant, daycare, house, building, space, or other location.

An EMF quiet zone introduces the concepts of willing and unwilling devices.

- A "willing" device is one which supports EMF quiet mode and is willing and able to engage with other willing devices to create an EMF quiet zone.
- An "unwilling" device is either one which does not support EMF quiet mode, i.e. "passive unwilling" devices, or one which does not want to be controlled while in an EMF quiet zone, i.e. "active unwilling" devices.
- A willing device can and may allow itself to be controlled by an administrator of an EMF quiet zone, such as in a plane, hospital, bar, restaurant, school, home, etc.
- A willing device can be asked to set a "check for messages" schedule that is controlled by the EMF quiet zone administrator.
- A willing device can be queried about what mode it is in. For example, all willing student devices can be asked whether they are currently in airplane mode, and a list can be displayed for the teacher with checkmarks next to all students with "willing" devices which are currently "off."
- A willing device can have different privileges based on the class or type of user, e.g. admin, teacher, and student in a school.
- A willing device can receive information that is specific to the location, e.g. a company could send information to a willing device about where in the building the cafeteria or gym is, the hours the building is open, etc.
- A willing device could receive a coupon or special offer because of the fact that it is willing, e.g. a free coffee for allowing the device to be set to off for the duration of the user's time in the coffee shop.
- A willing device can fall into sleep mode when not in use. For example, a Wi-Fi router could be asleep by default, and only awakened via an EMF quiet mode protocol signal when a device wants to use Wi-Fi. While asleep the device waits passively to be told that it is needed, and only then wakes up and announces itself via the standard Wi-Fi protocols.

The administrator of an EMF quiet zone can use any of the rules-based controls provided by the device I/O controller application to set how the devices inside of the EMF quiet zone interact with their own wired or wireless I/O channels. See the discussion of Programmatic Control of Device I/O above for details.

In an embodiment, an individual in an EMF quiet zone has an incoming call but, because the individual's phone has been set to "off," he cannot receive the call. In this case, when the phone is put into EMF quiet mode, the phone contacts the carrier and lets the carrier know which EMF quiet zone that the individual is in. When the carrier sees an incoming call for that individual, instead of sending it to the individual's phone, the carrier first signals the EMF quiet zone that the individual has an incoming call. The EMF quiet zone then turns the individual's cellular I/O channel to "on," and informs the carrier that the phone can now accept the incoming call. Embodiments of the invention embed this technique into systems as well as devices.

EMF Quiet Mode Signaling and EMF Quiet Mode Protocol

For the purposes of the discussion herein, two additional concepts are defined:

EMF quiet mode signaling refers to sending a signal via either a wired or wireless channel to the device which understands EMF quiet mode.

An EMF quiet mode protocol is a set of commands by which a device can be controlled. This includes a set of status commands for querying the device's current state, as well as a set of commands for turning the wired and wireless I/O channels on and off.

Signaling in EMF Quiet Zones

If the purpose of an EMF quiet zone is to minimize EMF, i.e. wireless radiation, the question turns to how does one signal in a way that does not add additional EMF to the EMF quiet zone? For example, if one wanted to use the existing cellular, or Bluetooth, or Wi-Fi frequencies for signaling, devices would need to have these I/O channels set to "on" to send and receive the control signals, and if those channels are "on" and used for signaling, then it is impossible to create an EMF quiet zone. The question then becomes, is it possible to create a signaling protocol that does not add to the already overloaded EMF spectrum. The answer is yes, and the way to do it is to pick a frequency which does no or minimal harm. Not all EMF is bad, and some frequencies are not harmful to humans, animals, or insects, so long as the intensity is kept below a particular threshold. Visible light (from ~430 THz-~770 THz) is one such portion of the EMF spectrum which is known to not cause harm to humans, animals, or insects as long as the brightness, i.e. intensity measured in lumens, is kept below the level which causes damage to the retina. Audible sound (from ~20 Hz-~20 kHz) is another portion of the EMF spectrum which also does not cause harm to humans, animals, or insects as long as the intensity (measured in dB) is kept below the level which causes either short or long term hearing loss.

As we look more closely at these two parts of the EMF spectrum, we notice they each have advantages and disadvantages.

Light's advantage is that it is very high frequency, which means that digital data can be sent at a very high rate, while its disadvantage is that it does not go around corners unless it is traveling down a fiber optic cable, or is bounced off of mirrors. As such, there is no convenient way to use light to message the router in the next room or the cellular repeater in the closet.

Sound's advantage is that it goes around corners, but its disadvantage is that it is fairly low frequency. As such, the amount of digital data which can be sent is lower than that using light. The other disadvantage of sound is that it would be extremely annoying to hear audio signaling between devices in the human hearing range, especially if there are many devices which are in the EMF quiet zone.

Because light does not go around corners easily, it is necessary to use a portion of the audio spectrum, and one way to do that would be to use a portion of the spectrum which is close to but outside of human hearing range. In embodiments of the invention, we pick a portion of the audio spectrum, which is above human ability to hear, but also one which does not impact animals or insects. It turns out there is a large range above 30 kHz (the upper limit of human hearing), and below 535 kHz (AM radio), which could be used.

EMF Quiet Mode Signaling

Use a frequency range which does not harm humans, animals, or insects. The exact frequency range is somewhere between about 30 kHz (just above human hearing) and 535 kHz (AM radio). Signaling requires both a sender and a receiver.

Under certain circumstances other frequencies could be acceptable as well. For example, if the EMF quiet mode signaling receiver is able to receive commands passively, i.e. without signaling its presence as is done with Wi-Fi and Bluetooth today, it would be acceptable because it is not adding EMF to the EMF quiet zone. Using the human audio range might also be acceptable in certain circumstances as well, e.g. if you wanted to be able to configure your grandmother's device over the phone while you are conversing with her.

Figure 6:
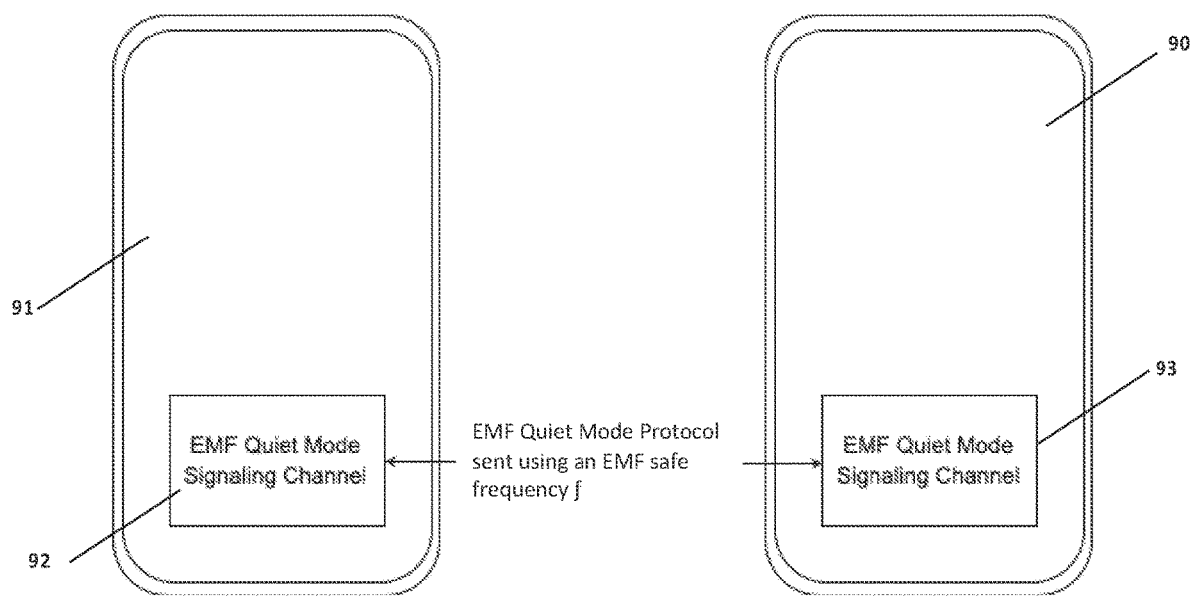
FIG. 6 is a block diagram that shows signaling in EMF quiet zones.

FIG. 6 is a block diagram that shows signaling in EMF quiet zones. In FIG. 6, two devices 90, 91 use EMF safe frequencies for respective EMF quiet mode signaling channels 92, 93.

EMF Quiet Mode Protocol

The EMF quiet mode protocol includes a set of commands which can be used to query or set the status of wired or wireless I/O channels on any device which supports EMF quiet mode. The commands can be sent over a wired or wireless connection, or via the EMF quiet mode signaling frequency. The protocol includes commands for both status and control. Status commands allow the protocol to query the device to find out things such as how many wired and wireless I/O channels the device has, how many channels are controllable, what is the current state, e.g. on vs off, of each channel, whether the device is a willing and smart device, and what version(s) of the protocol it can handle. Control commands allow the protocol to set the state of the device, e.g. "turn the Bluetooth wireless I/O channel off," or "turn the cellular wireless I/O channel on," or "tell the cellular wireless I/O channel to turn off and check for incoming messages every ten minutes."

The EMF signaling protocol might use something like TCP/IP to transport the commands, but this might be too much overhead if the frequency is on the lower end of the spectrum. Therefore, the protocol might have two modes—a higher frequency mode which uses standard protocols like TCP/IP, and a lower frequency mode which is more on the level of the fax machine protocol, which uses audio tones to denote commands and responses.

An EMF quiet mode device can be a "smart" device or a "dumb" device. A smart device is one which understands rules-based controls such as "check every ten minutes" or "turn off when the airplane is taking off and landing" and is able to execute those rules-based controls itself. A dumb device is one whose wired and wireless I/O channels respond to commands such as "turn on" and "turn off," but does not have the ability to run any rules-based controls itself. These devices require an administrator device which runs the rules engine and sends control signals to the devices it controls as the rules fire.

Computer System

Figure 7:
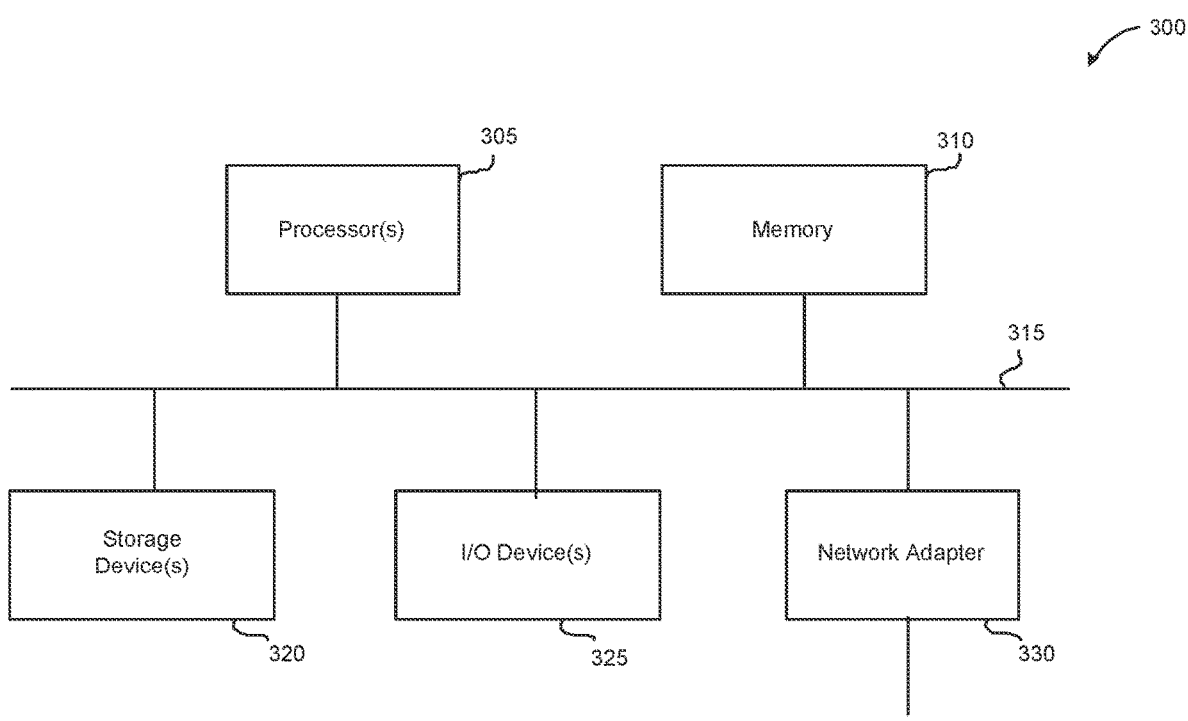
FIG. 7 shows a diagrammatic representation of a machine in the example form of a computer system within which a set of instructions for causing the machine to perform one or more of the methodologies discussed herein may be executed.

FIG. 7 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 300 may include one or more central processing units ("processors") 305, memory 310, input/output devices 325, e.g. keyboard and pointing devices, touch devices, display devices, storage devices 320, e.g. disk drives, and network adapters 330, e.g. network interfaces, that are connected to an interconnect 315. The interconnect 315 is illustrated as an abstraction that represents any one or more separate physical buses, point to point connections, or both connected by appropriate bridges, adapters, or controllers. The interconnect 315, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 310 and storage devices 320 are computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 310 can be implemented as software and/or firmware to program the processor 305 to carry out actions described above. In some embodiments, such software or firmware may be initially provided to the processing system 300 by downloading it from a remote system through the computing system 300, e.g. via network adapter 330.

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

I claim:

1. A method for reducing electric and magnetic field (EMF) radiation from a device, comprising:
   installing a device input/output (I/O) controller application for programmatic control of said device's I/O channels on said device, wherein said device I/O controller application comprises a user interface and a set of control rules, and wherein said device I/O controller application is resident on said device;
   sensing, by said device, events that fire said control rules; and
   responsive to firing at least one of said control rules in said set of control rules, controlling, by said device I/O controller application, one or more I/O channel settings on said device, wherein said set of control rules comprises any of:
time-based rules, including fixed time and dynamic time,
location-based rules,
activity-based rules,
movement-based rules,
voice-based rules,
country defaults, and
rules triggered by internal and external inputs to device sensors.

2. The method of claim 1, wherein said I/O channels comprise low-level device I/O channels, and
wherein said low-level device I/O channels comprise any of a cellular network, Wi-Fi, and Bluetooth.

3. The method of claim 1, wherein said I/O channels comprise higher-level device I/O channels; and
wherein said higher-level device I/O channels comprise any of phone, text, email, Internet, games, music, and video.

4. The method of claim 1, said I/O channels comprising wired and wireless channels.

5. The method of claim 4, said wired channels comprising Ethernet, USB, and HDMI.

6. The method of claim 4, said wireless channels comprising cellular, Bluetooth, and Wi-Fi.

7. The method of claim 1, further comprising:
an administrator device having resident thereon a said device I/O controller application comprising a multiple-device I/O controller application for configuring and controlling at least one administrable EMF emitting device comprising a respective administrable device I/O application and respective wireless and wired I/O channels;
said administrator device addressing and sending commands to said at least one EMF emitting administrable device.

8. The method of claim 7, wherein said administrable EMF emitting device comprises any of Wi-Fi routers and extenders, computers, laptops, hubs, routers, Xboxes, PlayStations, cell phone repeaters, smart homes, smart meters, Wi-Fi enabled thermostats, Bluetooth and Wi-Fi enabled baby monitors, and security cameras.

9. The method of claim 7, further comprising:
providing rules-based controls for categorizing devices and users;
setting up and applying said rules-based controls for specific categories or combinations of categories;
delivering said rules-based controls to at least one administrable EMF emitting device; and
said multiple-device I/O controller application displaying acknowledgment and current settings for said at least one administrable EMF emitting device on said administrator device.

10. The method of claim 1, further comprising:
said device comprising one or more administrable devices;
a corporate device I/O application, said corporate device I/O application providing an administrator with control of said one or more administrable devices belonging to, or controlled by, a corporation or other entity;
said corporate device I/O application communicating with a software distribution system;
said software distribution system addressing said one or more administrable devices;
said software distribution system sending commands to said one or more administrable devices, each of which comprises a respective device I/O application and respective wireless and wired I/O channels.

11. The method of claim 10, further comprising:
said corporate device I/O application providing an administrator with control to classify and characterize said one or more administrable devices based on device characteristics comprising any of device type and device category; and
said device I/O controller application allowing said administrator to classify and categorize device users.

12. The method of claim 10, further comprising:
assigning controls and rules on any of a gross basis to all devices, or on a fine grained basis to any combination of device and/or user, type and/or category; and
said administrator deciding whether the rules to be used on the device are the most or least restrictive of all of the applicable rules when a device/user is part of more than one type or category.

13. A method for reducing electric and magnetic field (EMF) radiation from a device, comprising:
installing a device input/output (I/O) controller application for programmatic control of said device's I/O channels on said device;
wherein said device I/O controller application further comprises a user interface;
wherein said device I/O controller application is resident on said device;
said device I/O controller application setting a quiet interval of said device's wired or wireless I/O channels;
wherein said device is off during the quiet interval, said device periodically turns itself on, performs a check for incoming messages, then turns itself off again.

14. The method of claim 13, further comprising:
after said check is made, a type and number of messages is messaged to a user using any of audio, device shake, and visual display.

15. A method for reducing overall EMF radiation from a device, comprising:
providing an electric and magnetic field (EMF) quiet zone administered by an administrator based on rules defined by the administrator that specifies how quiet the zone is by controlling said device's wired or wireless input/output (I/O) channels to create an EMF quiet zone in which some or all devices in a vicinity respond to a request to put themselves into EMF quiet mode;
said device emitting EMF via wireless protocols, said device supporting said EMF quiet mode either of:
actively, wherein said device is able and willing to be controlled by allowing control of the device's wired and wireless device I/O channels either directly on the device, or via an EMF quiet mode protocol; and
passively, wherein said device is programmed to turn wired or wireless I/O channels on and off;
said EMF quiet zone turning some or all of said device's wired or wireless I/O channels on and off using any of a timer, or other characteristics comprising any of location, time of day, orientation, proximity to others, or until commanded to do so via a voice command or application programming interface (API) request; and
said EMF quiet zone setting a quiet interval of such device's wired or wireless I/O channels, wherein said device is off during the quiet interval, said device periodically turns itself on, performs a check for incoming messages, then turns itself off again.

16. The method of claim 15, wherein said interval is based on any of: fixed time, dynamic time, location, country, activity, movement; orientation, voice control, and sensor control.

17. The method of claim 15, further comprising:
after said check is made, a type and number of messages is messaged to a user using any of audio, device shake, and visual display.

18. The method of claim 15, further comprising:
controlling an EMF quiet zone capable device by an administrator either by direct manipulation or via an API.

19. The method of claim 15, further comprising:
said EMF quiet zone capable device comprising a device I/O application user interface that responds to said control.

20. The method of claim 19, further comprising:
controlling said device I/O application by receipt of administrator instructions from an administrator computer comprising an alternate device I/O application user interface.

21. The method of claim 20, further comprising:
controlling said EMF quiet zone capable device via any of an EMF quiet mode protocol and an EMF quiet mode signaling channel delivered to a device EMF quiet mode signaling channel.

22. The method of claim 19, further comprising:
receiving signals from wireless or wired I/O channels or said EMF quiet mode signaling channel at an EMF quiet mode protocol handler; and
responsive thereto, controlling wired and wireless I/O channels within the device.

23. The method of claim 19, further comprising:
providing an EMF quiet mode protocol defining a set of commands and responses by which the EMF quiet zone administrator controls devices that enter the EMF quiet zone.

24. The method of claim 15, further comprising:
said EMF quiet zone comprising willing and unwilling devices, wherein a willing device supports EMF quiet mode and is willing and able to engage with other willing devices to create an EMF quiet zone, and wherein a passive unwilling device does not support EMF quiet mode and an active unwilling device does not want to be controlled while in an EMF quiet zone.

25. The method of claim 24, further comprising any of:
a willing device can and may allow itself to be controlled by an administrator of an EMF quiet zone;
asking a willing device to set a check for messages schedule that is controlled by the EMF quiet zone administrator;
querying a willing device about what mode it is in;
providing a willing device with different privileges based on the class or type of user;
a willing device receiving information that is specific to location;
a willing device receiving a coupon or special offer because of the fact that it is willing; and
a willing device falling into sleep mode when not in use and awakening said device via an EMF quiet mode protocol signal when said device wants to use Wi-Fi, or other protocol which is normally on all the time.

26. The method of claim 15, further comprising:
using quiet mode signaling to send a signal via either a wired or wireless channel to a device which understands EMF quiet mode protocol.

27. The method of claim 15, further comprising:
providing an EMF quiet mode protocol comprising a set of commands by which a device is controlled, said EMF quiet mode protocol comprising a set of status commands for querying the device's current state and a set of commands for turning the wired and wireless I/O channels on and off.

* * * * *